June 9, 1964 D. W. AVIS 3,136,928
SENSING CIRCUIT
Original Filed June 30, 1960
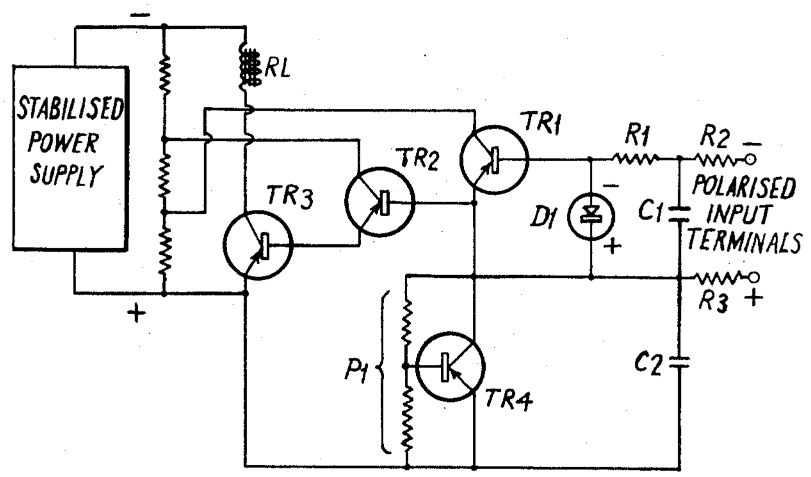
Inventor
D. W. Avis
By Holcombe, Wetherill & Brisebois
Attorneys United States Patent Office 3,136,928

Patented June 9, 1964

3,136,928

SENSING CIRCUIT

Donald William Avis, Cambridge, England, assignor to Pye Limited, Cambridge, England, a British company Original application June 30, 1960, Ser. No. 39,919. Divided and this application Oct. 23, 1961, Ser. No. 146,908

Claims priority, application Great Britain July 6, 1959

4 Claims. (Cl. 317—148.5)

The present invention relates to a sensing circuit for producing an indication in response to a small D.C. current or voltage. This application is a division of application Serial No. 39,919 filed June 30, 1960, and now abandoned.

According to the present invention a sensing circuit comprises a transistor amplifier to which a small D.C. current or voltage to be indicated is applied and comprising a plurality of stages and a relay or the like connected in the output circuit of the final transistor amplifying stage which relay or the like is operated upon the input current or voltage exceeding a certain small value, said circuit being polarised so that the relay or the like is only operated when the input current or voltage is of a particular polarity and said relay or the like operating an indicating device.

The transistor amplifier may comprise a common emitter input stage feeding a common collector intermediate stage which in turn feeds a common emitter output stage. The transistor amplifier may include a temperature stablising circuit consisting of a further transistor for neutralising fluctuations in the collector current of the input transistor with changes in temperature. The sensing circuit possesses a high insulation to earth and very low leakage in order to make it responsive to very small input voltages or currents.

In order that the invention may be more fully understood reference will now be made to the accompanying drawing which is a circuit diagram of one embodiment of a sensing circuit according to this invention.

Referring to the drawing, the embodiment of sensing circuit illustrated has both input terminals completely isolated from earth and a polarised input sensitivity of the order of 1/10 volt at about 1 $\mu$a. so that it may be wired into a circuit rather in the same way as a moving coil meter movement and produce an output indication, by operation of a relay, when an input current or voltage of a certain polarity applied thereto exceeds a very small value. The high sensitivity on both voltage and current makes the circuit extremely versatile as it may be connected into a bridge circuit for voltage measurements and a bucking circuit for current measurements. These methods increase the stability by three orders of magnitude when voltages of about 100 v. and currents of about 1 ma. are being dealt with. Since the sensing circuits must have a high resistance to earth, they are built on panels of low leakage insulating material and each panel is provided with its own individual stabilised power pack built on the panel. The power transformer and the relay employed must themselves possess extremely low leakage between windings and their cores. To this end the power transformer employed is constructed with a single layer of heavily insulated wire for a primary working at less than 0.5 volt R.M.S. input. All the individual power transformers are fed in turn from a single very low voltage mains transformer.

The input transistor TR1 is an R.F. type of component which will operate at low collector voltage thereby ensuring a low value of collector leakage current (Ico), a desirable feature in this application. This stage operates in the common emitter configuration, the input being between base and emitter. Transistor TR2 is the second stage and is arranged in a common collector circuit feeding transistor TR3 arranged as the common emitter output stage with the relay RL connected in the collector circuit. The collector current of TR3 is arranged to be about 15 ma. at full drive and is ample to operate the 350 ohm relay RL. The relay contacts close at about 10 ma. which corresponds to an input current of about 0.3 $\mu$a. to the base electrode of TR1. The Ico current of TR1 fluctuates quite markedly with temperature and must be satisfactorily neutralised if the unit is to be temperature stable. If a resistor whose value is independent of temperature is used, then neutralising can only be correct at one temperature. If feedback is introduced the overall gain must be impaired if a useful improvement is to be obtained. It is possible to use a temperature dependent resistor, but these are only obtainable in a few types and cannot have their characteristics changed so as to obtain the optimum values. In the circuit as shown, a further transistor TR4 is used for temperature stabilisation, whose base is fed from a potential divider P1 connected between its collector and emitter. By selecting appropriate values for the portions of potentiometer P1 it is possible to obtain a wide range of thermal drift compensation. If desired the potentiometer may constitute a single resistor having an adjustable tapping which is set to the desired value.

The input circuit is effectively polarised by a diode D1 which has a low forward resistance compared to the input resistors R1, R2 and R3. Reverse currents flow through diode D1 and not into the base of TR1. Condensers C1 and C2 in conjunction with the input resistors are provided so as to make the circuit insensitive to transient surges. Furthermore they prevent damage to the diode or transistors from these or any other transients.

When properly adjusted the circuit is insensitive to input current until its value is about half that required to close the relay RL, which component has adjustable stops fitted to the armature, the result being a very small operating differential.

In order to obtain the high insulation to earth and low leakage performance of the circuit, the insulation of the relay winding and the power supply input have to be very effective.

I claim:

1. A sensing circuit for producing an indication in response to a small D.C. current or voltage and consisting of a transistor amplifier to which the small current or voltage to be indicated is applied, said amplifier comprising a common emitter input stage, a common collector intermediate stage and a common emitter output stage, a diode device connected across the input to said common emitter input stage to polarise said circuit, relay means connected to said common emitter output stage and operated upon the input current or voltage exceeding a predetermined small value, and temperature stabilising means comprising a further transistor connected in the emitter circuit of said common emitter input stage for neutralising fluctuations in the collector current of said input transistor with changes in temperature.

2. A sensing circuit for producing an indication in response to a small D.C. current or voltage and consisting of a transistor amplifier to which the small current or voltage to be indicated is applied, said amplifier comprising first, second and third transistors each having an emitter, a base and collector, a stabilised power supply for said transistors, said first transistor being connected as a common emitter input stage and having input terminals connected to its base and emitter, a diode device connected across said input terminals to polarise said circuit so that it only responds to inputs of a chosen polarity, a fourth transistor connected in the emitter circuit of said first transistor and forming temperature stabilising means for neutralising fluctuations in the collector current of said first transistor with changes in temperature, a connection from the emitter of said first transistor to the base of said second transistor which is connected as a common collector intermediate stage, connections from the collector of said first and second transistors to said stabilised power supply, a connection from the emitter of said second transistor to the base of said third transistor connected as a common emitter output stage, and relay means connected between the collector of said third transistor and said stabilised power supply, said relay means being operated upon the input current or voltage applied to said circuit exceeding a predetermined small value.

3. A circuit as claimed in claim 2, in which the collector of the fourth transistor is connected to the emitter of the first transistor and the base of said fourth transistor is connected to an intermediate point on a potential divider connected between its emitter and collector.

4. A circuit as claimed in claim 3, in which the input circuit to the first transistor comprises a resistor connected between each input terminal and said diode device, a first condensed connected across said input terminals, and a second condenser connected between one terminal of said first condenser and the emitter of said fourth transistor.

References Cited in the file of this patent

UNITED STATES PATENTS

| | | |
|---|---|---|
| 2,864,904 | Jensen | Dec. 16, 1958 |
| 2,877,310 | Donald | Mar. 10, 1959 |
| 3,008,091 | Van Overbeek et al. | Nov. 7, 1961 |
| 3,075,151 | Murray | Jan. 22, 1963 |

FOREIGN PATENTS

| | | |
|---|---|---|
| 564,571 | Canada | Oct. 14, 1958 |

OTHER REFERENCES

Bohr, "Sensitive Relay Circuits," Radio-Electronics, pp. 112, 114, 115, January 1958.